United States Patent [19]

Wirtz

[11] 4,320,596
[45] Mar. 23, 1982

[54] PLANTER FORMED OF CONCRETE OR A SIMILAR SETTABLE MATERIAL

[75] Inventor: Hans Wirtz, Würselen, Fed. Rep. of Germany

[73] Assignee: Dyckerhoff & Widmann Aktiengesellschaft, Munich, Fed. Rep. of Germany

[21] Appl. No.: 180,935

[22] Filed: Aug. 25, 1980

[30] Foreign Application Priority Data

Aug. 31, 1979 [DE] Fed. Rep. of Germany ....... 2935180

[51] Int. Cl.³ ............................................. A01G 9/02
[52] U.S. Cl. .......................................... 47/66; D6/64; D6/182; D11/143; 52/608
[58] Field of Search ....................... 52/590, 608; 47/33, 47/66, 82–83; D11/143–156; D6/64, 182–183

[56] References Cited

U.S. PATENT DOCUMENTS

| D. 235,908 | 7/1975 | Rosenwach | D11/144 |
| D. 239,129 | 3/1976 | Rosenberger | D11/143 |
| 2,219,870 | 10/1940 | Jacobus | 47/66 |
| 2,799,972 | 7/1957 | Teixeira | 47/66 |
| 3,683,549 | 8/1972 | Simmon | 47/66 |
| 3,686,791 | 8/1972 | Mills | 47/83 |
| 4,262,467 | 4/1981 | Faisant et al. | 47/66 X |

FOREIGN PATENT DOCUMENTS

| 2000679 | 7/1971 | Fed. Rep. of Germany | 52/608 |
| 2415781 | 10/1975 | Fed. Rep. of Germany | 52/608 |
| 2415782 | 10/1975 | Fed. Rep. of Germany | 52/608 |
| 2502975 | 7/1976 | Fed. Rep. of Germany | 52/608 |
| 2428786 | 2/1980 | France | 47/66 |
| 1505322 | 3/1978 | United Kingdom | 47/66 |

*Primary Examiner*—Robert E. Bagwill
*Attorney, Agent, or Firm*—Toren, McGeady & Stanger

[57] ABSTRACT

A planter formed of concrete or a similar settable material includes an upwardly extending wall having a laterally closed outer surface and an upwardly extending inner surface bounding a hollow space having an upwardly extending axis. Three equiangularly spaced projections are formed on the outer surface of the planter. The outer edge of each projection extends perpendicularly of the projection axis which extends radially outwardly from the axis of the hollow space. Between the projections, the outer surface is formed of concavely shaped circular arcs.

11 Claims, 3 Drawing Figures

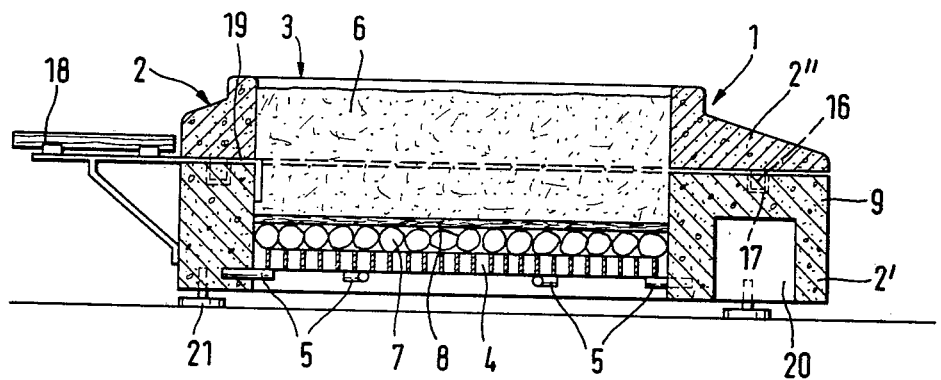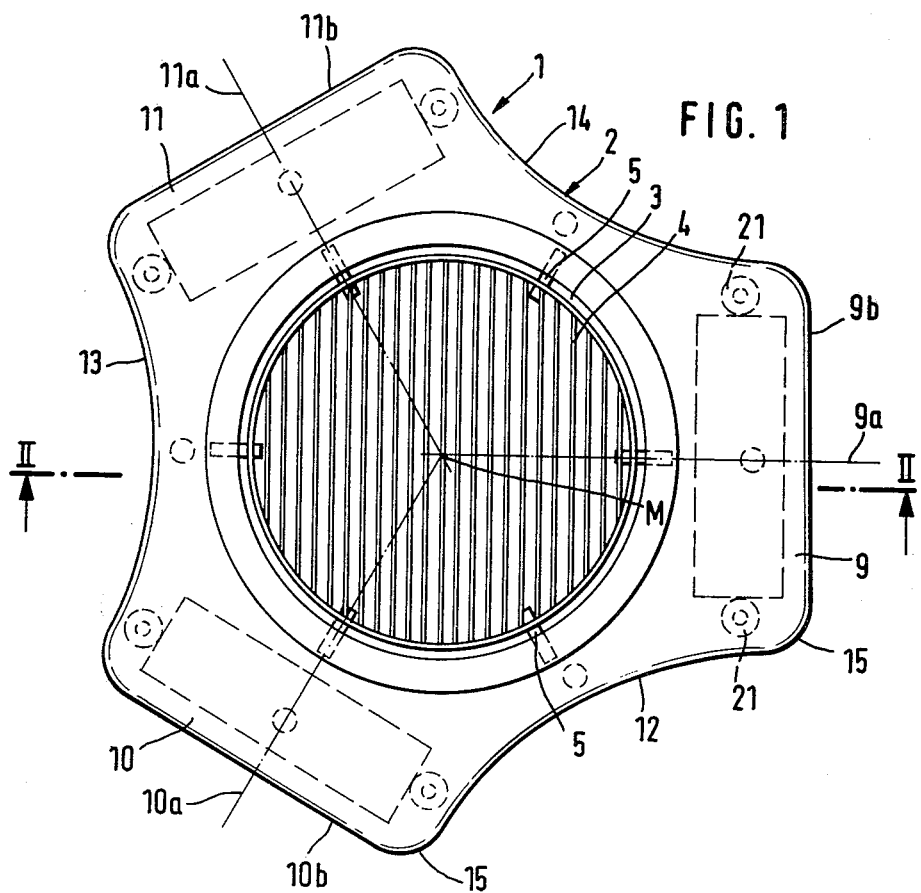

PLANTER FORMED OF CONCRETE OR A SIMILAR SETTABLE MATERIAL

SUMMARY OF THE INVENTION

The present invention is directed to a planter or container for plants formed of concrete or a similar settable material and the planter includes a central hollow space, preferably circular, in which the plant root structure is positioned.

Concrete planters of various shapes and designs are known. Generally, such planters have a rectangular or round cross section and, depending on their size, have different weights. It is also known to combine such planters into groups. Such arrangements are particularly popular in designing open urban spaces. Planters having a hexagonal outer shape have been found to be especially useful in forming such groups.

While continuous closed groups of such planters are arranged for use as partitions or boundaries, planters with a round outside surface are not suitable because they form unsightly recesses. Generally, such recesses are to some extent avoided by using planters having hexagonally shaped outer surfaces. Such hexagonally shaped planters have a somewhat rigid appearance which prevents a smooth, pleasant configuration in the overall layout, further such planters have a tendency to form corners and angles where dirt tends to accumulate.

Therefore, it is the primary object of the present invention to provide a planter or plant container suitable for use by itself or in combination with similar containers so that the disadvantages experienced in known containers are avoided.

In accordance with the present invention, a planter which overcomes the known disadvantages has three projections on its outside surface which extend outwardly relative to a central hollow space. The axes of the projections extend radially relative to the axis of the hollow space and are equiangularly spaced apart at an angle of 120°. The outer end faces of the projections extend perpendicularly of the projection axis. Between the projections the outside surface of the planter has a concavely shaped configuration. Preferably, the concave surfaces are curved in the shape of a circular arc.

Advantageously, the bottom of the central hollow space is provided with a bar grate covered with a fine mesh, a fibrous web or the like.

The planter can be constructed in two parts, a lower part and an upper part separated by a horizontal joint. A bench support can be arranged along at least one section of the outside surface.

Spaces free of concrete can be provided in the outwardly extending projections. Advantageously, such spaces are constructed as recesses which are open at the bottom of the projections.

The essential advantage of these prefabricated planter units embodying the present invention resides in the combination of curved and straight outside surfaces in connection with the triangular symmetry of the projections. Such outside surface configuration affords the possibility of a clean combination of two such elements making it possible to achieve an especially pleasant configuration characterized by curved surfaces. With the appropriate choice of the dimensions of the individual prefabricated units, a combination of three or four planters result in recessed spaces especially suitable for receiving groups of seats or benches. Further, the planters can be constructed to include bench supports fastened to the planters. Preferably, the plant containers are used to receive plants. However, if the bottom of the container is closed, it can also be used as a fountain basin or the like.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a plan view of a planter embodying the present invention;

FIG. 2 is a sectional view taken along the line II-II in FIG. 1; and

DETAILED DESCRIPTION OF THE INVENTION

Figure 3:
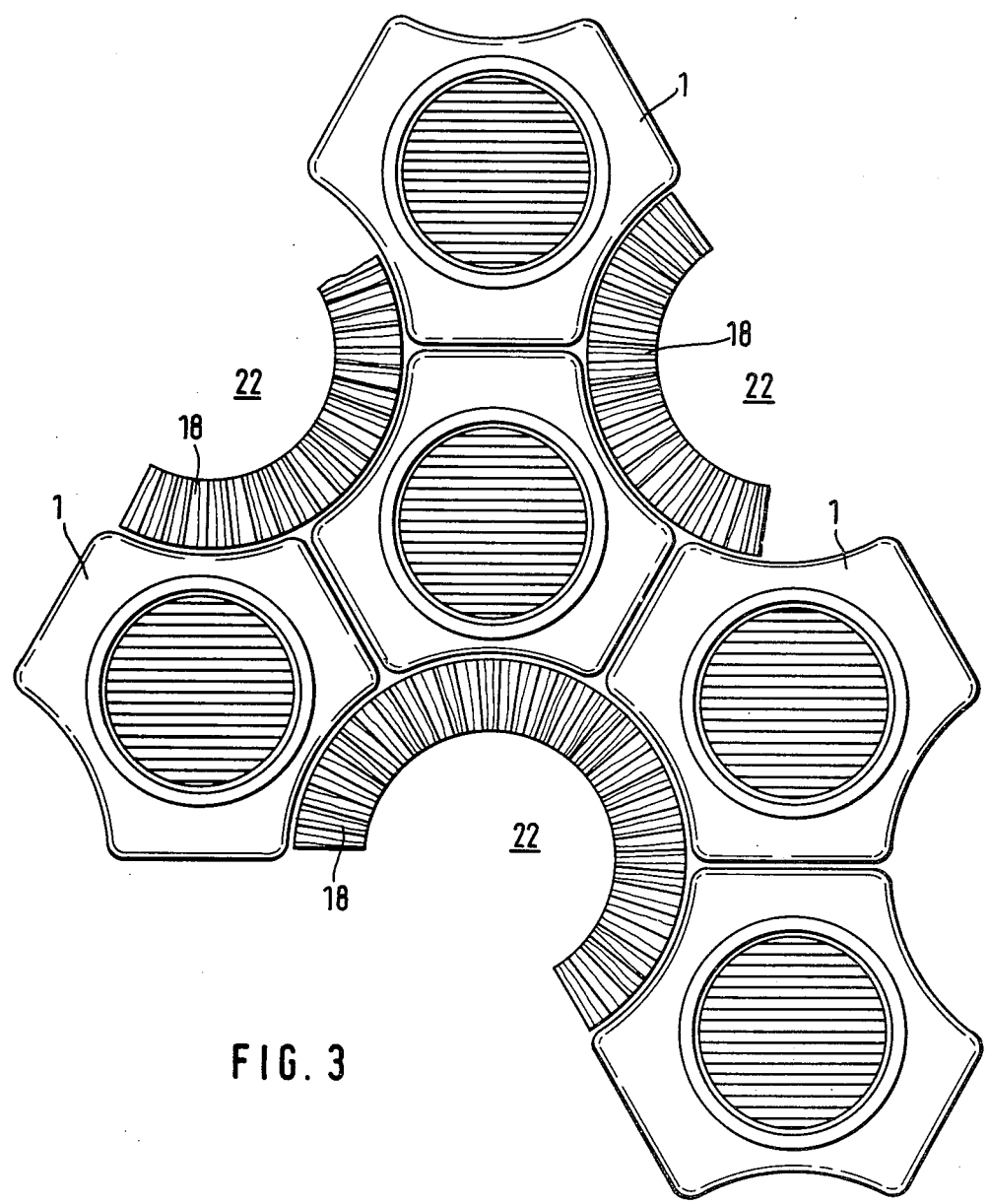
FIG. 3 is a plan view of a number of planters as shown in FIGS. 1 and 2 arranged in a group.

In FIGS. 1 and 2 a planter 1 is illustrated consisting of a concrete body forming a central circular hollow space 3. The hollow space 3 has an upwardly extending axis and its open bottom includes a bar grate 4 resting on supports 5 fixed in the concrete bounding the hollow space. To prevent the plant root material 6 which is placed in the hollow space from falling through the grate, a layer of non-cohesive material 7, such as gravel, is placed over the bar grate. The material 7 is covered by a fine mesh 8 or by a fibrous web or the like. It is also possible to close the bottom of the central hollow space 3 such as by means of a solid slab of concrete.

As viewed in plan in FIG. 1, the outside surface of the concrete body 2 of the planter includes three outwardly extending projections 9, 10, 11 extending from the central hollow space. Each projection 9, 10, 11 has an axis 9a, 10a, 11a extending radially outwardly from the center M of the hollow space. The axes 9a, 10a, 11a are equiangularly spaced apart at an angle of 120°. The outer end faces 9b, 10b, 11b of each projection extend perpendicularly of the axis of the projection. Between each projection, the outside surface of the concrete body 2 consists of an arcuate surface 12, 13, 14 having a concave configuration in the shape of a circular arc. The edges located at the transition sections between the end faces 9b, 10b, 11b and the surfaces 12, 13, 14 are rounded edges 15.

As can be seen in FIG. 2, the planter 1 is constructed in two parts, the planter consists of a lower part 2' and an upper part 2" with a horizontal joint separating the two parts. For centering and locking the parts in position, support bolts 16 project downwardly from the upper part 2" and engage in corresponding recesses in the upper surface of the lower part 2'.

Apart from affording facility and handling, the two part design has the advantage that bench support 18 can be secured on the lower part 2' with L-shaped supports irons 19 of the bench supports extending through the horizontal joint between the two parts and extending downwardly along the surface defining the central hollow space 3. By placing the upper part 2" on the lower part 2' the bench supports are covered and locked in place. To effect a reduction in the weight, downwardly open hollow spaces 20 are formed in the outwardly extending projections 9, 10, 11. In place of hollow spaces, it is also possible to insert into a similar recess a moulded body of like material, such as polystyrene.

The concrete body of the planter is supported on the ground by means of leveling screws 21.

In FIG. 3 a plan view is shown of a plurality of planters embodying the present invention grouped to form recesses 22 in which seats are placed on the bench supports 18. In this grouped arrangement the end faces of the projections of adjacent planters 1 are disposed in juxtaposition so that the concavely shaped circular surfaces 12, 13, 14 form continuous curved surfaces bounding the recesses 22.

While specific embodiments of the invention have been shown and described in detail to illustrate the application of the inventive principles, it will be understood that the invention may be embodied otherwise without departing from such principles.

What is claimed is:

1. A planter formed of concrete or a similar material capable of setting to form a rigid structure, comprising wall means having a laterally closed upwardly extending outer surface and an upwardly extending inner surface bounding an upwardly open hollow space having an upwardly extending axis for receiving the root structure of a plant, wherein the improvement comprises that the outer surface of said wall means includes three angularly spaced outwardly extending projections, each of said projections having an axis extending perpendicularly of the axis of said hollow space with the axis of said projections being spaced 120° apart, each of said projections having an outer end face extending substantially perpendicularly of the axis of said projection and forming portions of said outer surface, and said outer surface between said projections comprising concavely shaped surfaces.

2. Planter, as set forth in claim 1, wherein said concavely shaped surfaces are curved in the shape of a circular arc.

3. Planter, as set forth in claims 1 or 2, wherein said central hollow space being open at the lower end thereof, and a bar grate extending across the lower end portion of said hollow space.

4. Planter, as set forth in claim 3, wherein a member having fine openings therethrough is disposed over said bar grate.

5. Planter, as set forth in claim 4, wherein said member comprises a fine mesh.

6. Planter, as set forth in claim 4, wherein said member comprises a fibrous web.

7. Planter, as set forth in claim 1, wherein said wall means comprises a lower part and an upper part separated from one another by a horizontal joint.

8. Planter, as set forth in claim 7, wherein a bench support is positioned along at least one of the concavely shaped surfaces of said outer surface of said wall means.

9. Planter, as set forth in claim 1, wherein said projections having spaces therein free of concrete.

10. Planter, as set forth in claim 9, wherein said spaces free of concrete are formed as recesses opening upwardly from the bottom of said projections with the upper ends of said recesses terminating below the upper surfaces of said projections.

11. Planter, as set forth in claim 8, wherein said bench support includes an L-shaped bracket extending inwardly between the lower part and upper part of said wall means with one end of said bracket depending downwardly along the inner surface of said wall means defining said hollow space.

* * * * *